United States Patent Office 3,580,903
Patented May 25, 1971

3,580,903
KETODEXTRAN COMPOUNDS
Anthony N. de Belder and Bernt J. Lindberg, Uppsala, Sweden, assignors to Pharmacia AB, Uppsala, Sweden
No Drawing. Filed Apr. 2, 1969, Ser. No. 812,848
Claims priority, application Sweden, Apr. 8, 1968, 4,696/68
Int. Cl. C08b 25/04
U.S. Cl. 260—209D
2 Claims

ABSTRACT OF THE DISCLOSURE

Derivative of dextran represented by the general formula:

$$A[CH(OH)]_{m-n}[CO]_n$$

wherein $m$ represents the number of secondary alcohol groups in dextran having the formula $A[CH(OH)]_m$, and wherein $n$ is a number chosen such that the degree of substitution $n/m$ lies between 0.01 and 0.05, and wherein $[CH(OH)]_m$ represents the groups bearing the secondary alcohol groups of the dextran and A represents the remainder of the dextran. The dextran derivatives are very useful in intermediate products and may be reacted with a number of substances to form valuable and useful products. Such can be employed as a carrier for pharmaceuticals containing hydrazine and amino groups.

---

This invention relates to dextran derivatives containing keto groups at one or more of the carbon atoms 2, 3 and 4 in the keto-substituted anhydro-glucose unit rings. The new dextran derivatives may be represented by the general formula $A[CH(OH)]_{m-n}[CO]_n$, where $m$ represents the number of secondary alcohol groups in dextran which can be regarded as conforming to the general formula $A[CH(OH)]_m$, where $n$ in the former is a number chosen such that the degree of substitution $n/m$ lies between 0.01 and 0.50. A is that part of the dextran not including the forementioned $[CH(OH)]_m$ groups. The degree of substitution can be chosen within the limits 0.01 to 0.5 but is preferably chosen between the limits 0.03 and 0.3.

Dextran is, as is well known, a polysaccharide built up of glucose units which are linked to each other preponderantly by $\alpha(1\rightarrow 6)$ bonds.

The following formula represents an $\alpha(1\rightarrow 6)$ linked glucose unit before oxidation

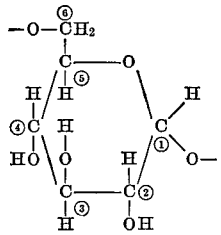

The following formula represents the corresponding glucose unit in which a secondary hydroxyl group has been converted to a keto group (after oxidation):

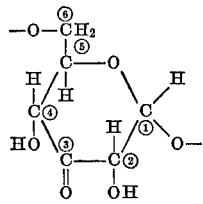

In the above example the oxidation to the keto group has taken place at carbon atom 3. Likewise the oxidation to a keto group may occur at carbon atom 2 or 4.

The new dextran derivative is very useful as an intermediate product and as a modified dextran product, e.g. for technical purposes. For example, the dextran derivative with the hereinbefore defined formula—in the following referred to as ketodextran—has been found to possess valuable properties in that it undergoes reaction with substances which react with keto groups. It is therefore especially suitable for reaction with substances which react with keto groups particularly, for example, those that are biologically active. It can thus serve as a reactive intermediate for the preparation of biologically active and degradable polymers with $\alpha(1\rightarrow 6)$ glucosidic linkages.

Ketodextran may thus be reacted with different substances which react with keto groups. Hereby, valuable derivatives may be obtained. It can thus be reacted with e.g. hydrazines and hydrazides giving hydrazones. The important anti-tubercular drug isonicotinic acid hydrazide can by this means be coupled to ketodextran. Ketodextran also reacts with e.g. thiosemicarbazides giving thiosemicarbazones. The isonicotinic acid hydrazone of ketodextran inhibits the growth of *Mycobacterium tuberculosis*. It may furthermore be reacted with amines with the formation of Schiff's bases, e.g. sulphanilamide. The Schiff's bases are easily decomposed again. The polymer can thus serve as a carrier for pharmaceuticals containing hydrazine and amino groups.

By direct reduction of the ketodextrans with sodium borohydride in water a modified polysaccharide is obtained which, apart from unchanged glucose units, also contains other sugars, namely, mannose, allose and galactose. According to a feature of this invention the aforesaid new polymers are prepared by a process which comprises reacting dextran having the formula $A[CH(OH)]_m$ with the appropriate amount of a mild oxidising agent corresponding to $n$ moles of oxygen calculated as [O]. Thereby $n$ secondary hydroxyl groups are converted to $n$ keto groups. Some depolymerisation may take place simultaneously with the oxidation of the dextran molecule. To compensate for this depolymerisation, one can add a dextran of higher average molecular weight to the reaction mixture in which the oxidation takes place than that desired for the ketodextran.

According to a feature of the invention, the aforesaid ketodextran can be prepared by using a sulphoxide in admixture with an acid anhydride, e.g. acetic anhydride, for the oxidation. Any suitable sulphoxide may be used. Dimethyl sulphoxide and tetramethylene sulphoxide have proved to be particularly suitable. Other suitable carboxylic acid anhydrides, phosphorous pentoxide, polyphosphoric acid, orthophosphoric acid and phosphorous acid may be used instead of acetic acid anhydride in the mixture. The different degrees of substitution are obtained by varying the proportions of the reactants and the conditions of the reaction. The persons skilled in the art can by means of simple preliminary experiments determine the conditions for attaining the desired degree of substitution. To avoid depolymerisation during the processing it is desirable that the working up of the reaction mixture and the purification of the ketodextran formed be conducted in a mild way. It has been found that ketodextran can be conveniently isolated from the reaction mixture by precipitation in a water-miscible solvent such as acetone or ethanol. The precipitate thus obtained may be washed with the precipitating agent and thereafter redissolved and reprecipitated. By fractionation, for example, by gradual addition of ethanol to an aqueous solution of ketodextran, fractions of the desired average molecular weight may be obtained. By partial hydrolysis, e.g. acid hydrolysis, products of high average molecular weight can be depolymerised to products of lower average molecular weight.

During the reaction with sulphoxide, apart from the keto groups, varying amounts of the undesirable methylthiomethyl ether substituents as well as minor amounts of acetyl groups may be introduced in the dextran depending on the conditions during the reaction. It has been found that such methylthiomethyl groups can be removed by treating the raw ketodextran with a weak acid under mild conditions so that the dextran does not become too extensively hydrolysed. Minor amounts of acetyl groups, if present, are also easily removed.

The invention will be further illustrated by the following examples.

EXAMPLE 1

20 g. of dextran ($\overline{M}_w$ 500,000) were dissolved in 220 ml. of dimethylsulphoxide. 95 ml. of acetic anhydride were then added dropwise with stirring. The reaction mixture was stirred at 40° C. for 90 min. and then precipitated into acetone. The precipitate was filtered and washed with acetone. It was then dissolved in 150 ml. of water to which was added 7 ml. of 10 N hydrochloric acid. The mixture was maintained at 35° C. for 2 hours and then precipitated with ethanol. The precipitate was washed free from acid with 85% ethanol. After reprecipitation from a mixture of water and ethanol, 15 g. of ketodextran ($\overline{M}_w$ 125,000) was obtained. The degree of substitution with respect to keto groups was determined by the hydroxylamine method and was found to be 0.09. The sulphur content was less than 0.03%. IR-absorption at 1730 cm.$^{-1}$ (keto group). The product may be further purified by reprecipitation etc.

EXAMPLE 2

10 g. of dextran ($\overline{M}_w$ 70,000) were dissolved in 100 ml. of dimethylsulphoxide. 9 g. of polyphosphoric acid were added and the mixture thus obtained was kept at 50° C. for 2 hours. After precipitation with acetone and repeated precipitation from water/acetone 7 g. of product were secured. The average molecular weight of the ketodextran was 52,000 and the degree of substitution with respect to the keto groups was 0.12. IR-absorption at 1730 cm.$^{-1}$ (keto group).

The following examples illustrate the product's applicability as an intermediate in the preparation of other valuable products.

EXAMPLE 3

Coupling of isonicotinic acid hydrazide to ketodextran 2 g. of ketodextran, according to Example 2, were dissolved in 100 ml. of water. The solution thus obtained was acidified weakly with acetic acid. 0.5 g. of isonicotinic acid hydrazide was added and the mixture allowed to react for 24 hours. The product was precipitated in ethanol. After reprecipitation from water/ethanol and freeze-drying 1 g. of the coupled product was obtained which contained 5% isonicotinic acid hydrazide. The product showed a UV-absorption at 265 nm.

EXAMPLE 4

Coupling of sulphanilamide to ketodextran 2 g. of ketodextran, according to Example 2, were dissolved in 20 ml. of water. The solution thus obtained was buffered with a small quantity of sodium acetate and 0.7 g. sulphanilamide was then added.

The mixture was maintained at 70° C. for 10 min. After cooling, the mixture was filtered and the mixture was filtered and the filtrate gel filtered on a gel bed consisting of dextran polymerised with epichlorohydrin having a water regain of 2.5 grams of water per gram of dry substance (Sephadex G–25).

1.6 g. of a high molecular weight product were obtained consisting of the polymer to which was attached sulphanilamide groups.

EXAMPLE 5

Coupling of 4-methyl-3-thiosemicarbazide to ketodextran 2 g. of ketodextran with a degree of substitution of 0.05 were dissolved in 40 ml. of water. 0.25 g. of 4-methyl-3-thiosemicarbazide were then added to the solution thus obtained and the mixture shaken at room temperature overnight. The mixture was filtered and the filtrate gel filtered on the same medium as described in Example 4. 1.5 g. of a high molecular weight product were obtained having a nitrogen content of 1.5%. It showed a UV-absorption at 268 nm.

EXAMPLE 6

Reduction of ketodextran 100 g. of ketodextran with a degree of substitution of ca. 0.1 were dissolved in 3 l. of water and the pH was adjusted to 7–8. 20 g. of sodium borohydride were added and the solution was left to stand for 60 min. After neutralising, dialysis and precipitation in ethanol, 100 g. of product were obtained which did not show any keto absorption in IR.

What we claim is:

1. A derivative of dextran, said derivative containing keto groups at at least one of carbon atoms 2, 3 and 4 in the keto substituted anhydro-glucose unit rings and said derivative being represented by the general formula

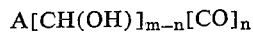

wherein $m$ represents the number of secondary alcohol groups in dextran having the following formula

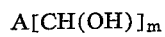

and wherein $n$ is a number chosen such that the degree of substitution $n/m$ lies between 0.01 and 0.5, and wherein $[CH(OH)]_m$ represents the groups bearing the secondary alcohol groups of the dextran and A represents the remainder of the dextran.

2. A derivative of dextran as claimed in claim 1, wherein the degree of substitution $n/m$ lies between 0.03 and 0.3.

References Cited

UNITED STATES PATENTS 3,269,964   8/1966   Curtis _____ 260—209
3,480,613   11/1969  Walton _____ 260—210

LEWIS GOTTS, Primary Examiner
J. R. BROWN, Assistant Examiner

U.S. Cl. X.R.
260—209R, 999